US007928372B2

(12) United States Patent
Yamaguchi et al.

(10) Patent No.: US 7,928,372 B2
(45) Date of Patent: Apr. 19, 2011

(54) MASS SPECTROMETER

(75) Inventors: Shinichi Yamaguchi, Kyoto (JP); Masaru Nishiguchi, Kyoto (JP); Kiyoshi Ogawa, Kyoto (JP); Yoshihiro Ueno, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 485 days.

(21) Appl. No.: 12/016,522

(22) Filed: Jan. 18, 2008

(65) Prior Publication Data

US 2008/0210862 A1 Sep. 4, 2008

(30) Foreign Application Priority Data

Jan. 22, 2007 (JP) ................................ 2007-011220

(51) Int. Cl.
*B01D 59/44* (2006.01)

(52) U.S. Cl. ......................... 250/291; 250/282; 250/287

(58) Field of Classification Search .................. 250/291
See application file for complete search history.

(56) References Cited

U.S. PATENT DOCUMENTS

| | | | | |
|---|---|---|---|---|
| 5,077,472 | A * | 12/1991 | Davis | 250/287 |
| 5,789,875 | A * | 8/1998 | Hiramoto et al. | 313/505 |
| 6,300,625 | B1 * | 10/2001 | Ishihara | 250/287 |
| 6,949,738 | B2 * | 9/2005 | Yamaguchi et al. | 250/287 |
| 7,482,583 | B2 * | 1/2009 | Ueno | 250/287 |

FOREIGN PATENT DOCUMENTS

| | | |
|---|---|---|
| JP | 11-135060 A | 5/1999 |
| JP | 11-297267 A | 10/1999 |

* cited by examiner

*Primary Examiner* — Phillip A Johnston
(74) *Attorney, Agent, or Firm* — Sughrue Mion, PLLC

(57) ABSTRACT

A mass spectrometer is provided in which ions are favorably introduced into a loop orbit or favorably led out from the loop orbit without affecting the motion of the ions flying along the loop orbit. An ion-introduction orbit 5 is set to correspond to the orbit (ejection orbit portion 4) of ions after being bent by the sector-shaped electric field E1 in the loop orbit 4. When ions are introduced, a voltage applied to the electrode unit 11 is put to zero to release the sector-shaped electric field E1. Then the ions emitted along the ion-introduction orbit 5 fly straight in the electrode unit 11. The direction and position of the ions coming out from the exit end of the electric field is the same as those ions flying along the loop orbit 4. Therefore, there is no need for placing a deflection electrode for introducing/leading-out ions on the loop orbit.

6 Claims, 2 Drawing Sheets

MASS SPECTROMETER

BACKGROUND OF THE INVENTION

The present invention relates to a mass spectrometer, and more specifically to a multi-turn time-of-flight mass spectrometer or a Fourier-transformation mass spectrometer including an ion optical system in which ions are made to fly repeatedly along a closed loop orbit.

In a time-of-flight mass spectrometer (TOF-MS), the mass of an ion is generally calculated from the time of flight which is obtained by measuring a period of time required for the ion to fly at a fixed distance, on the basis of the fact that an ion accelerated by a fixed energy has a flight speed corresponding to the mass of the ion. Accordingly, elongating the flight distance is particularly effective in enhancing the mass resolution. However, elongation of a flight distance on a straight line requires unavoidable enlargement of the device, which is not practical, so that a mass spectrometer called a multi-turn time-of-flight mass spectrometer has been developed in order to elongate a flight distance.

In such a multi-turn time-of-flight mass spectrometer as disclosed in Patent Document 1 for example, the flight distance is effectively elongated by forming a figure-eight ("8") shaped closed loop orbit using two to four of the sector-formed electric fields and causing ions to repeatedly fly along this loop orbit multiple times. In a multi-turn time-of-flight mass spectrometer disclosed in Patent Document 2, the flight distance is effectively elongated by forming a quasi-polygon shaped closed loop orbit using multiple sector-formed electric fields and causing ions to repeatedly fly along this loop orbit multiple times. This construction can make the flight distance free from limitation due to the entire device size and mass resolution improve as the number of turns increases.

In the multi-turn time-of-fight mass spectrometer as stated earlier, an ion source is placed outside a loop orbit. Departed ions from this ion source are introduced into the loop orbit and begin flying along it. An ion detector is placed outside the loop orbit, and ions which have turned around along the loop orbit a predetermined number of times are taken from the loop orbit and reach the ion detector to be detected. Therefore, it is necessary to introduce ions into the loop orbit, and lead the ions out from the loop orbit.

In a mass spectrometer described in Patent Document 2, electrodes for deflecting ions are placed on the loop orbit. A voltage is applied to the electrodes when an ion passes through the electrodes, forming a deflection electric field which bends the orbit of an ion. Ions are accordingly led into or taken from the loop orbit. However, placing such electrodes on a loop orbit causes a decrease of the ions' transmittivity and possibly poses a decrease of analytical sensitivity. In addition, if the shape of the electrodes for deflection is simple such as a parallel-plate shape so as to simplify the structure, the convergence of the ions to be targeted is often adversely affected, resulting in a possible decrease of the mass resolution or the mass accuracy.

In the mass spectrometer described in Patent Document 1, an aperture for introducing ions or an aperture for leading ions out is placed on a portion of an electrode of a sector-formed electric field for forming a loop orbit. When an ion is introduced into or led out through the aperture, the voltage applied to the electrode is turned off (i.e. to zero potential). However, placing an aperture on an electrode for forming a sector-formed electric field causes disarrangement of the electric field near the aperture, which may adversely affect the turning of the ions. Hence, for practical purposes, a means of correction for correcting the disarrangement of the electric field is required. This leads to a complicated configuration.

Patent Document 1: Japanese Unexamined Patent Application Publication No. H11-135060

Patent Document 2: Japanese Unexamined Patent Application Publication No. H11-297267

SUMMARY OF THE INVENTION

The present invention has been achieved in view of the aforementioned problems, and a main objective thereof is to provide a multi-turn time-of-flight mass spectrometer or a Fourier-transformation mass spectrometer wherein ions are favorably introduced into a loop orbit or favorably led out from the loop orbit without affecting the motion of the ions that fly along the loop orbit.

A first aspect of the present invention to solve the aforementioned problem provides a multi-turn time-of-flight mass spectrometer or a Fourier-transformation mass spectrometer, in which ions are made to repeatedly fly along a closed loop orbit by effects of a plurality of sector-shaped electric fields placed in series so as to separate the ions in accordance with their mass to charge ratios, wherein:

an ion-introduction orbit for introducing ions into the loop orbit from outside is set to correspond to a flying direction of an ion after being deflected when passing through one of the sector-shaped electric field so that the ions come straight into an entrance end of an electrode unit for forming the sector-shaped electric field.

A second aspect of the present invention to solve the aforementioned problem provides a multi-turn time-of-flight mass spectrometer or a Fourier-transformation mass spectrometer, in which ions are made to repeatedly fly along a closed loop orbit by effects of a plurality of sector-shaped electric fields placed in series so as to separate the ions in accordance with their mass to charge ratios, wherein:

an ion-lead-out orbit for leading ions out from the loop orbit to outside is set to correspond to a flying direction of an ion before being deflected when passing through one of the sector-shaped electric fields so that the ions come straight out from an exit end of an electrode unit for forming the sector-shaped electric field.

In the mass spectrometer according to the first aspect of the present invention, a dedicated deflection electrode or the like is not used in order to introduce ions into the loop orbit from outside to make the ions fly along the loop orbit. Instead, when a voltage applied to an electrode unit for forming one sector-shaped electric field is set to zero for example to release the sector-shaped electric field, ions that have flown along the ion-introduction orbit from outside come out from the exit end of the electrode unit along the same orbit of the ions that have flown along the loop orbit and are bent by the sector-shaped electric field.

In the mass spectrometer according to the second aspect of the present invention, a dedicated deflection electrode or the like is not used in order to make ions flying along the loop orbit break away off the loop orbit to take them to the outside. Instead, when a voltage applied to an electrode unit for forming one sector-shaped electric field is set to zero for example to release the sector-shaped electric field, ions that have flown along the loop orbit and come into the area of the sector-shaped electric field are not bent to pass through and come out from the exit end of the electrode unit.

In each case, however, it is necessary to keep the ions that fly straight along the ion-introduction orbit or the ion-lead-out orbit from failing to pass thorough the electrode to touch the inner side of the electrode unit. Hence, it is preferable that the degree of the ions' bent by the sector-shaped electric field be small. Therefore, it is preferable that the electrode unit to which the ion-introduction orbit or the ion-lead-out orbit is set have a small deflection angle (more than 0 degrees, of course) of ions by the sector-shaped electric field formed by the electrode unit. In addition, it is preferable that the distance between the electrode unit and other adjacent electrode units be large so that the ion-introduction orbit or the ion-lead-out orbit, both of which are linear, is properly set.

In this way, the electrode unit itself or the other adjacent electrode units will not be a barrier, enabling a proper setting of the ion-introduction orbit and the ion-lead-out orbit.

In general, since the form of an electric field at the entrance end and the exit end of a sector-shaped electric field is disordered, which causes the disorder of the loop orbit of the ions, a shield plate for edge field correction is placed outside the entrance end and outside the exit end of the electrode unit which forms a sector-shaped electric field. The shield plate is sometimes placed to hang into the entrance end or the exit end of an electrode unit to narrow the area thereof. Hence, it may be a barrier to the ion-introduction orbit or the ion-lead-out orbit. In this case, it is preferable that a shield plate has an aperture for ions flying along the ion-introduction orbit or the ion-lead-out orbit to pass through. Since the potential of the shield plate is the same as that of the center of the loop orbit, placing an aperture on a shield plate hardly affects the sector-shaped electric field.

With the mass spectrometers according to the first and second aspect of the present invention, it is possible to preferably introduce ions into the loop orbit from the outside and lead ions out flying along the loop orbit to the outside without placing deflection electrodesor the like, which are undesirable, on a loop orbit other than electrode units for forming a sector-shaped electric field which are necessary for comprising the loop orbit. In addition, it is not necessary to place an aperture for allowing ions to pass through on an electrode unit for forming a sector-shaped electric field. Therefore, the loss of the target ions while flying along the loop orbit is reduced and high analytical sensitivity is assured. At the same time, the spatial and temporal convergency of the ions having the same mass is enhanced, and the mass resolution can be easily assured.

EXPLANATION OF THE NUMERALS

Figure 1A:
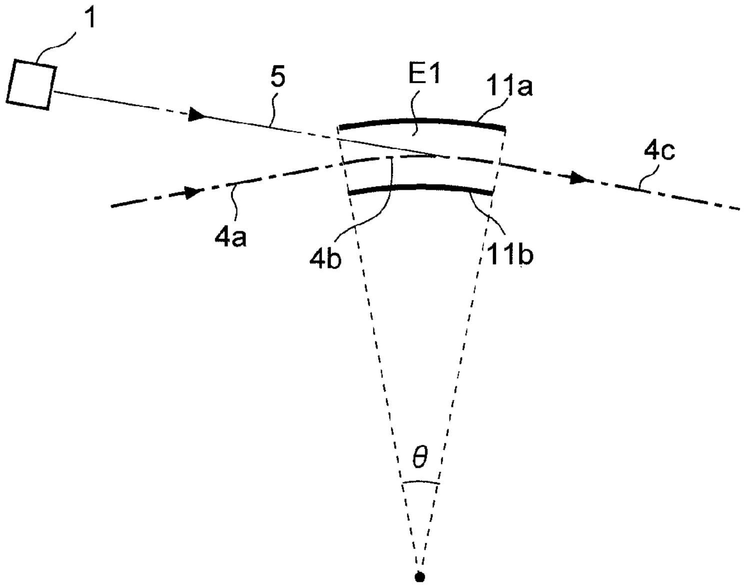
FIG. 1A is a specific explanation diagram of an ion-introduction orbit of a multi-turn time-of-flight mass spectrometer according to an embodiment of the present invention.

1 . . . Ion Source
2 . . . Ion Detector
3 . . . Flight Space
11-18 . . . Electrode Unit
11*a*-18*a* . . . Outer Electrode
11*b*-18*b* . . . Inner Electrode
E1-E8 . . . Sector-Shaped Electric Field
4 . . . Loop Orbit

4*a*, 4*d* . . . Incident Orbit Portion
4*b*, 4*e* . . . Curve Orbit Portion
4*c*, 4*f* . . . Ejection Orbit Portion
5 . . . Ion-Introduction Orbit
6 . . . Ion-Lead-Out Orbit
20 . . . Shield Plate
20*a* . . . Ion Pass-Through Aperture

DETAILED DESCRIPTION OF A PREFERRED EMBODIMENT

An explanation will be made for a multi-turn time-of-flight mass spectrometer as one embodiment of the present invention referring to the drawings.

Figure 3:
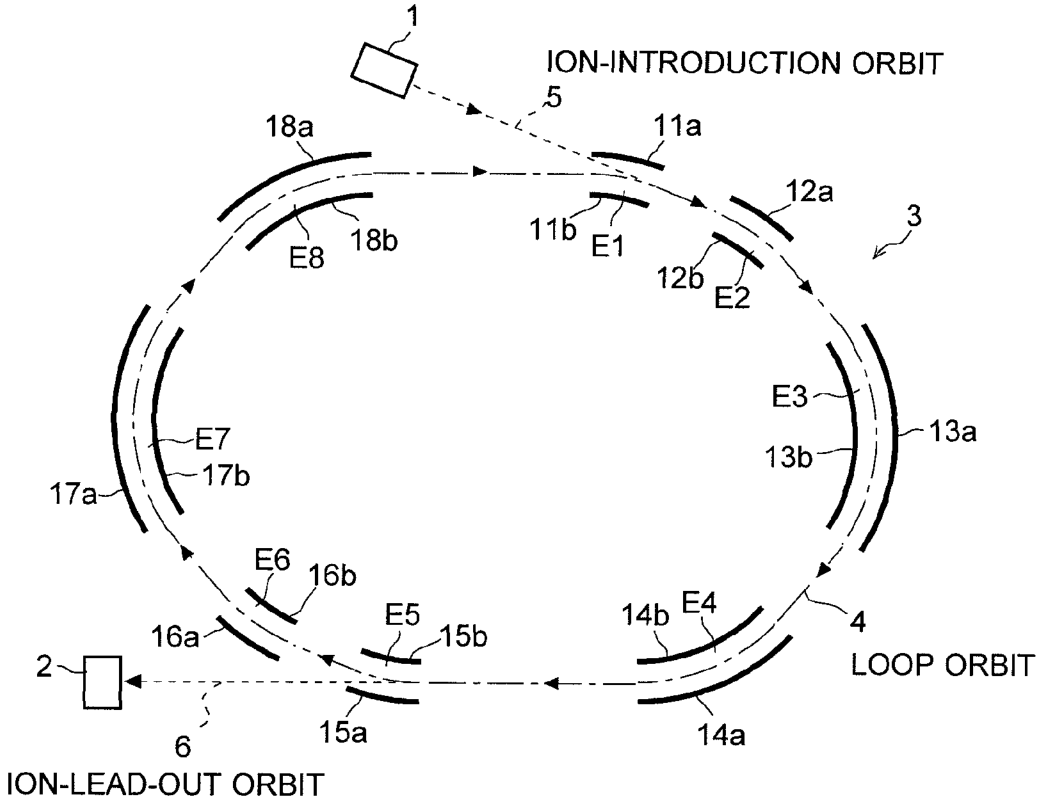
FIG. 3 is a schematic configuration diagram of an ion optical system of a multi-turn time-of-flight mass spectrometer according to an embodiment of the present invention.

FIG. 3 is a schematic configuration diagram of a mass spectrometer of the present embodiment. In FIG. 3, an ion source 1, an ion detector 2, a flight space 3 in which a plurality of electrode units 11 through 18 are placed, and other units are placed inside a vacuum chamber which is not illustrated. Each electrode unit is composed of a pair of an outer electrode and an inner electrode.

The ion source 1 is a flight starting point of an ion to be analyzed. It may be a n ionization unit for example for ionizing molecules to be analyzed, in which the ionization method is not particularly limited. When the mass spectrometer is used as a detector for a GC, for example, the ion source 1 is constructed to ionize gas molecules by electron impact ionization or chemical ionization. When the mass spectrometer is used as a detector for an LC, the ion source 1 is constructed to ionize liquid molecules by atmospheric pressure chemical ionization or electrospray ionization. A method called MALDI (Matrix Assisted Laser Desorption Ionization) is suitable for the analysis of a protein or similar high-molecular compound. The ion source 1 does not necessarily produce ions by itself, but it can be such a one that temporarily holds ions produced by another ion source. An ion trap is one such type of ion source.

In the flight space 3, eight electrode units 11 through 18 are placed in order to make ions fly along the loop orbit 4. The number of electrode units may be other than eight, of course. The eight electrode units 11 through 18 are made by cutting a double wall cylinder into eight fractions at a predetermined angle. For each of the electrode units 11 through 18, a power source is placed to apply a predetermined voltage between the outer and inner electrode. The applied voltage forms toroidal type sector-shaped electric fields E1 through E8 in each area between the outer electrode and the inner electrode. The eight sector-shaped electric fields E1 through E8 are placed in series and are spaced from each other at predetermined intervals. This forms a loop orbit 4 which passes through the inside of the sector-shaped electric fields E1 through E8. In the area between the adjacent sector-shaped electric fields, ions fly straight since no electric field is formed in principle.

The linear ion-introduction orbit 5 for putting departed ions from the ion source 1 into the loop orbit 4 is placed ahead of the electrode unit 11 (a pair of the outer electrode 11*a* and the inner electrode 11*b*) which forms the sector-shaped electric field E1. The ion-lead-out orbit 6 makes ions that have flown along the loop orbit 4 break away off the loop orbit 4 to linearly take them into the ion detector 2. The ion-lead-out orbit 6 is placed after the electrode unit 15 (a pair of the outer electrode 15*a* and the inner electrode 15*b*) which forms the sector-shaped electric field E5.

The detail of the ion-introduction orbit 5 and the ion-lead-out orbit 6 will be described with reference to FIG. 1. At first, the ion-introduction orbit 5 is explained referring to FIG. 1A.

Now, the loop orbit 4 around the sector-shaped electric field E1 can be considered to comprise the following three parts: the incident orbit portion 4*a* in which ions coming out from the sector-shaped electric field E8 of the previous section fly until they reach the sector-shaped electric field E1; the curve orbit portion 4*b* in which ions windingly fly in the sector-shaped electric field E1 under the influence of its electric field; and the ejection orbit portion 4*c* in which ions coming out from the sector-shaped electric field E1 fly until they reach the sector-shaped electric field E2 of the next section. Ideally speaking, ions fly straight in the incident orbit portion 4*a* and the ejection orbit portion 4*c*. Strictly speaking, the orbits illustrated in the figures are merely a central orbit; actual ions can be considered to be dispersed around this orbit. The ions' bend in the sector-shaped electric field E1 can be expressed with deflection angle θ, and the greater the deflection angle θ is, the greater the bend of the ions becomes. When θ=0, ions do not bend (in this case, it is no longer a sector-shaped electric field).

The ion-introduction orbit 5 is basically set so as to correspond to the ejection orbit portion 4*c*. That is, it is set on an extension line of the ejection orbit portion 4*c* linearly extended to the inside of the electrode unit 11 (inside of the sector-shaped electric field E1) and the entrance end of the electrode unit 11. As understood from FIG. 1A, if the deflection angle θ is large, the ion-introduction orbit 5 set as stated earlier hits the outer electrode 11*a*. To avoid this, it is necessary that the deflection angle θ of the electrode unit 11 be set small. In addition, if the distance between the electrode unit 11 and the electrode unit 18 of the previous section is too small, the electrode unit 18 becomes a barrier to placing the ion-introduction orbit 5. Therefore, adequate distance is required.

In FIG. 1A, when ions emitted from the ion source 1 fly along the ion-introduction orbit 5, the sector-shaped electric field E1 is released by putting a voltage applied to the electrode unit 11 to zero. Then, the ions entered from the entrance end of the electrode unit 11 along the ion-introduction orbit 5 fly straight and come out almost perpendicularly from the center of the exit end of the electrode unit 11. Therefore, the ions fly as if they had flown along the incident orbit portion 4*a* and the curve orbit portion 4*b* of the loop orbit 4, and they are directly put into the loop orbit 4.

Ideally speaking, the ion-introduction orbit 5 and the ejection orbit portion 4*c* completely fit as stated earlier. In practice, not all ions flying along the curve orbit portion 4*b* as a central orbit come out from the same position and direction of the ejection orbit portion 4*c*. However, since general spectrometers are designed to keep such ions going around as well, incident ions having little deviation from the ion-introduction orbit 5 can be put into the loop orbit 4.

Next, the ion-lead-out orbit 6 is described with reference to FIG. 1B.

the loop orbit 4 around the sector-shaped electric field E5 can be considered to comprise the following three parts: the incident orbit portion 4*d* in which ions coming out from the sector-shaped electric field E4 of the previous section fly until they reach the sector-shaped electric field E5; the curve orbit portion 4*e* in which ions windingly fly in the sector-shaped electric field E5 under the influence of its electric field; and the ejection orbit portion 4*f* in which ions coming out from the sector-shaped electric field E5 fly until they reach the sector-shaped electric field E6 of the next section. Ideally speaking, ions fly straight in the incident orbit portion 4*d* and the ejection orbit portion 4*f*. This is the same as in the incident orbit portion 4*a* and the ejection orbit portion 4*c* which was stated earlier.

The ion-introduction orbit 6 is basically set so as to correspond to the incident orbit portion 4*d*. That is, it is set on an extension line of the incident orbit portion 4*d* linearly extended to the inside of the electrode unit 15 (inside of the sector-shaped electric field E5) and the exit end of the electrode unit 15. As understood from FIG. 1B, if the deflection angle θ is large, the ion-lead-out orbit 6 set as stated earlier hits the outer electrode 15*a*. To avoid this, it is necessary that the deflection angle θ of the electrode unit 15 be set small. In addition, if the distance between the electrode unit 15 and the electrode unit 16 of the subsequent section is too small, the electrode unit 18 becomes a barrier to placing the ion-lead-out orbit 6. Therefore, adequate distance is required.

Figure 1B:
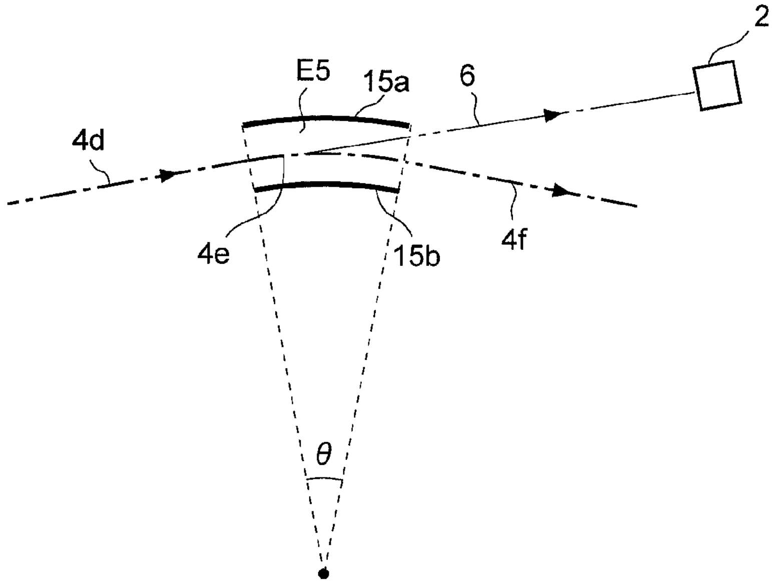
FIG. 1B is a specific explanation diagram of an ion-lead-out orbit of a multi-turn time-of-flight mass spectrometer according to an embodiment of the present invention.

In FIG. 1B, the sector-shaped electric field E5 is released by putting a voltage applied to the electrode unit 15 to zero just before ions flying along the loop orbit 4 reach the electrode unit 15. Then, the ions entered from the entrance end of the electrode unit 15 along the ion-introduction orbit 4*d* fly straight through the exit end of the electrode unit 15 and fly along the ion-lead-out orbit 6. Therefore, the ions can be taken off from the loop orbit 4 just after the entrance end of the electrode unit 15 and be led to the ion detector 2.

Figure 2:
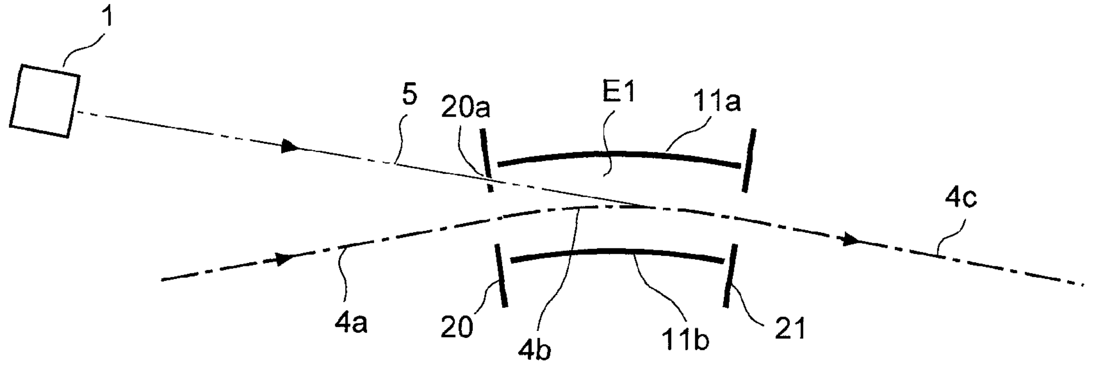
FIG. 2 is a diagram for another example of an ion-introduction orbit.

At entrance ends and exit ends of the electrode units 11 through 18, a sector-shaped electric field is disordered and is off its ideal state as stated earlier. Therefore, to decrease the disorder at the end portions, the shield plates 20 and 21 having a large ion pass-through aperture in the center are placed outside the entrance end and outside the exit end as illustrated in FIG. 2. The potential of the shield plates 20 and 21 is generally the same as that of the central orbit of the loop orbit 4. In case the shield plates 20 or 21 become a barrier to placing the ion-introduction orbit 5 and the ion-lead-out orbit 6, an ion pass-through aperture may be placed on the shield plates 20 and 21 as stated earlier. In the example of FIG. 2, the ion pass-through aperture 20*a* is placed on the shield plate 20 for keeping the shield plate 20 from being a barrier to the ion-introduction orbit 5. Such an ion pass-through aperture 20*a* placed on the shield plates 20 and 21 has little effect on the sector-shaped electric field, and the convergence of the ions flying along the loop orbit 4 is barely affected.

In the configuration illustrated in FIG. 3, the loop orbit 4 has a nearly elliptical shape. However, the shape of the loop orbit is not limited to this, and can be any such as a figure-eight ("8") shaped loop orbit.

The embodiment described thus far is merely an embodiment of the present invention, and may be modified or changed within the scope of the present invention.

What is claimed is:

1. A multi-turn time-of-flight mass spectrometer or a Fourier-transformation mass spectrometer, in which ions are made to repeatedly fly along a closed loop orbit by effects of a plurality of sector-shaped electric fields placed in series so as to separate the ions in accordance with their mass to charge ratios, wherein:

an ion-introduction orbit for introducing ions into the loop orbit from outside is set to correspond to a flying direction of an ion after being deflected when passing through one of the sector-shaped electric fields so that the ions come straight into an entrance end of an electrode unit for forming the sector-shaped electric field, wherein said ions are introduced without the use of deflecting electrodes.

2. The mass spectrometer according to claim 1, wherein the electrode unit to which the ion-introduction orbit is set has a small deflection angle of ions by the sector-shaped electric field formed by the electrode unit.

3. The mass spectrometer according to claim 1, wherein a shield plate for edge field correction is placed outside the entrance end of the electrode unit, and the shield plate has an aperture for ions that fly along the ion-introduction orbit to pass through.

4. A multi-turn time-of-flight mass spectrometer or a Fourier-transformation mass spectrometer, in which ions are made to repeatedly fly along a closed loop orbit by effects of a plurality of sector-shaped electric fields placed in series so as to separate the ions in accordance with their mass to charge ratios, wherein:

an ion-lead-out orbit for leading ions out from the loop orbit to outside is set to correspond to a flying direction of an ion before being deflected when passing through one of the sector-shaped electric fields so that the ions come straight out from an exit end of an electrode unit for forming the sector-shaped electric field, wherein said ions come straight out without the use of deflecting electrodes.

5. The mass spectrometer according to claim 4, wherein the electrode unit to which the ion-lead-out orbit is set has a small deflection angle of ions by the sector-shaped electric field formed by the electrode unit.

6. The mass spectrometer according to claim 4, wherein a shield plate for edge field correction is place outside the exit end of the electrode unit, and the shield plate has an aperture for ions that fly along the ion-lead-out orbit to pass through.

* * * * *